US009075892B2

(12) United States Patent
Lin et al.

(10) Patent No.: US 9,075,892 B2
(45) Date of Patent: Jul. 7, 2015

(54) METHOD FOR AUTOMATICALLY INSERTING AN EMBEDDED TOOLBAR INTO A WEB BROWSER DIRECTLY BY WAY OF A GATEWAY DEVICE

(75) Inventors: Chih-Chiang Lin, Taipei (TW); Hung-Chun Kao, Taipei (TW); Yu-Sheng Lin, Taipei (TW); Ting-Yu Chiang, Taipei (TW); Shih-Hui Wu, Taipei (TW); Wen-Yuan Wang, Taipei (TW); Cho-Hsuan Lee, Taipei (TW); Chi-Ming Luo, Taipei (TW); Yi-Hua Liang, Taipei (TW); Min-Hui Wu, Taipei (TW); Hsiao-Yun Chen, Taipei (TW); Kuan-Yi Chang, Taipei (TW); Chi-Hsiu Huang, Taipei (TW); Jia-Bin Lai, Taipei (TW); Heng-Chang Lin, Taipei (TW); Yu-Hsiang Wang, Taipei (TW)

(73) Assignee: MIIICASA HOLDING (CAYMAN) INC., Georgetown (KY)

(*) Notice: Subject to any disclaimer, the term of this patent is extended or adjusted under 35 U.S.C. 154(b) by 1163 days.

(21) Appl. No.: 12/929,435

(22) Filed: Jan. 25, 2011

(65) Prior Publication Data
US 2012/0151375 A1 Jun. 14, 2012

(30) Foreign Application Priority Data
Dec. 10, 2010 (TW) .............................. 99143168 A

(51) Int. Cl.
G06F 3/00 (2006.01)
G06F 7/04 (2006.01)
A63F 9/24 (2006.01)
G06F 17/30 (2006.01)
(Continued)

(52) U.S. Cl.
CPC .......... *G06F 17/30893* (2013.01); *H04L 67/02* (2013.01); *G06F 3/0481* (2013.01)

(58) Field of Classification Search
CPC .............. H04L 12/281; H04L 29/0809; H04L 41/0253; G06F 3/00; G06F 7/04
USPC .......................................... 715/236, 760, 741
See application file for complete search history.

(56) References Cited

U.S. PATENT DOCUMENTS

| 4,825,209 A * | 4/1989 | Sasaki et al. ................ 340/12.55 |
| 6,377,993 B1 * | 4/2002 | Brandt et al. ................. 709/227 |

(Continued)

FOREIGN PATENT DOCUMENTS

WO    WO 2008009490 A1 *   1/2008   .............. G06F 17/30

*Primary Examiner* — Arvin Eskandarnia
*Assistant Examiner* — Margishi Desai
(74) *Attorney, Agent, or Firm* — Bcon & Thomas, PLLC

(57) ABSTRACT

The present invention is to provide a method applicable to a network system for automatically inserting an embedded toolbar into a web browser directly by way of a gateway device, wherein a toolbar request instruction written in a dynamic scripting language is inserted into a web page message by the gateway device while the web page message is transmitted from a web server to a terminal device (e.g., a personal computer, personal digital assistant, etc.) through the gateway device, so as to enable the web browser of the terminal device to request an embedded toolbar serve for providing an embedded toolbar message according to the toolbar request instruction and then show an embedded toolbar corresponding to the embedded toolbar message on a web page received from the web server according to the web page message. Thus, a user of the terminal device doesn't have to install the embedded toolbar additionally.

7 Claims, 7 Drawing Sheets

(51) Int. Cl.
*H04L 29/08* (2006.01)
*G06F 3/0481* (2013.01)

(56) References Cited

U.S. PATENT DOCUMENTS

| | | | |
|---|---|---|---|
| 6,490,602 B1* | 12/2002 | Kraemer | 715/236 |
| 7,076,736 B2* | 7/2006 | Hugh | 715/743 |
| 7,200,804 B1* | 4/2007 | Khavari et al. | 715/230 |
| 8,572,173 B2* | 10/2013 | Briere et al. | 709/204 |
| 2003/0004830 A1* | 1/2003 | Frederick | 705/26 |
| 2003/0112280 A1* | 6/2003 | Driskell | 345/835 |
| 2003/0206192 A1* | 11/2003 | Chen et al. | 345/733 |
| 2005/0060283 A1* | 3/2005 | Petras et al. | 707/1 |
| 2005/0172262 A1* | 8/2005 | Lalwani | 717/109 |
| 2006/0059128 A1* | 3/2006 | Ruggle et al. | 707/3 |
| 2006/0074727 A1* | 4/2006 | Briere | 705/8 |
| 2008/0172404 A1* | 7/2008 | Cohen | 707/102 |
| 2008/0177859 A1* | 7/2008 | Nickerson | 709/217 |
| 2009/0164920 A1* | 6/2009 | Stelle | 715/760 |
| 2009/0171802 A1* | 7/2009 | Raygoza | 705/26 |
| 2009/0254835 A1* | 10/2009 | Shilo et al. | 715/744 |
| 2009/0287658 A1* | 11/2009 | Bennett | 707/3 |
| 2010/0031168 A1* | 2/2010 | Loriedo et al. | 715/760 |
| 2010/0211448 A1* | 8/2010 | Beenau et al. | 705/14.23 |
| 2011/0010352 A1* | 1/2011 | Jockisch et al. | 707/706 |
| 2011/0010357 A1* | 1/2011 | Kim | 707/708 |
| 2011/0040610 A1* | 2/2011 | Araiza-Boys | 705/14.35 |
| 2011/0202522 A1* | 8/2011 | Ciemiewicz et al. | 707/711 |
| 2011/0225511 A1* | 9/2011 | Xu | 715/753 |
| 2011/0231488 A1* | 9/2011 | Xu | 709/204 |
| 2011/0314518 A1* | 12/2011 | Ding et al. | 726/4 |
| 2012/0030294 A1* | 2/2012 | Piernot | 709/206 |
| 2012/0246272 A1* | 9/2012 | Eagan et al. | 709/217 |

* cited by examiner

US 9,075,892 B2

METHOD FOR AUTOMATICALLY INSERTING AN EMBEDDED TOOLBAR INTO A WEB BROWSER DIRECTLY BY WAY OF A GATEWAY DEVICE

FIELD OF THE INVENTION

The present invention relates to a method for automatically inserting an embedded toolbar into a web browser, more particularly to a method for automatically inserting a toolbar request instruction into a web page message directly by way of a gateway device while the web page message is being transmitted to a terminal device (e.g., a personal computer, personal digital assistant, etc.), so as to enable the web browser of the terminal device to request an embedded toolbar serve for providing an embedded toolbar message and then show an embedded toolbar corresponding to the embedded toolbar message on a web page.

BACKGROUND OF THE INVENTION

From the 1990s onward, a variety of application programs applicable to the Internet have emerged, driving commercial Internet service providers (ISPs) to grow at a fast pace and provide all kinds of value-added services. Nowadays, the aspects of web-based services are highly diversified and include such applications as World Wide Web (WWW), electronic mail (e-mail), file transfer via File Transfer Protocol (FTP), Bulletin Board System (BBS), and remote terminal emulation (e.g., Telnet), to name only a few. These Internet applications have penetrated out daily life and even influenced enterprise operation modes.

The Internet has developed so fast and brought convenience to so many, thanks to the invention of "web browsers". A "web browser" is a software application for displaying the files (e.g., text, images, and other information) in web servers or file systems on the Internet and enabling a user's terminal device (e.g., a computer) to interact with the files, so that the user's terminal device can connect to other websites through the files (e.g., via hyperlinks) or show all sorts of information for easy browsing. Some notable examples of currently available web browsers are Internet Explorer, Firefox, Google Chrome, Safari, and Opera. In order to provide convenience of use and prevent the influence of using different operating systems (e.g., Windows, Mac, UNIX), most of the web browsers, despite their different functions, support some common networking protocols like HTTP and HTTPS, as well as a good number of markup languages (e.g., HTML, XHTML, XML), dynamic scripting languages (e.g., JavaScript, JScript), or image file formats (e.g., GIF, PNG, JPEG). Presently, it is almost a standard procedure to install a web browser in any terminal device.

The images presented by a web browser—be they text, pictures, or videos—make it possible for the user to rapidly obtain a large amount of new information from the Internet or even make friends. Therefore, with a view to securing a strong market share in the highly competitive web browser industry, web browser providers have spared no effort in designing easy-to-use operation interfaces; consequently, the toolbars of web browsers are having more and more powerful functions. In addition to the fundamental functions such as moving to the homepage, the previous page, and the next page and adding bookmarks, many more convenient toolbar functions were developed. For example, after installing specific toolbar programs, the user can easily link to other websites, open his or her own blog, or receive other people's newly published articles (e.g., RSS articles) while using the web browser.

According to a survey report on the use of toolbars, conducted in May, 2009 by InsightXplorer, a market research consultancy based in Taipei, 80% of the Internet users interviewed have had the experience of installing toolbars, in which the most commonly used toolbars and their percentages are: the Yahoo! Kimo toolbar (36%), the Google toolbar (26.4%), and the MSN toolbar (15%). A further survey shows that the most common reasons for toolbar installation and their percentages are: "to facilitate search of information" (about 21.5%), "to facilitate linking to frequently used website services" (about 19.1%), and "installed along with an instant messenger software" (about 15.8%). A cross-analysis between the various reasons and the interviewees' ages reveals that Internet users aged 40 and above place more emphasis on the "to facilitate search of information" feature of toolbars, while those aged 19 and below would prefer toolbars "capable of translating web pages". It can be known from the foregoing that Internet users of different ages have different toolbar requirements. However, the existing toolbars fail to meet the needs of different age groups and are disadvantageous in many ways. First of all, the function buttons of a conventional toolbar are always shown in the web browser after the toolbar is installed, thus not only giving the web browser a crowded appearance, but also making it difficult for the user to find the button to be used. Secondly, the user may form different use habits while using the Internet for different purposes (e.g., for work, pastime, or friend making), but it is difficult to add a new button to or delete an existing button from the toolbar to suit the user's practical needs. Last but not least, if the user wants to use the same toolbar while connecting to the Internet from different locations (e.g., from home, the user's office, an Internet café), the toolbar software must be installed in each of the terminal devices to be used, either directly from a compact disc or by downloading the installation program from the Internet; otherwise, the desired toolbar will not be shown in the web browser of each terminal device. Needless to say, the repeated installation of the toolbar program is very inconvenient.

Given the heated competition in the Internet industry, it is critical for the related companies to provide toolbars which are more convenient in use, as a means to fostering users' use habit of the Internet and thereby effectively expanding company market shares. Hence, it is an important issue for the Internet-related companies to design a method which is applicable to the existing network systems and capable of inserting a toolbar into a web browser, wherein the method not only overcomes the drawbacks of the conventional toolbars but also facilitates the creation of a personalized operation interface.

BRIEF SUMMARY OF THE INVENTION

In view of the fact that the conventional toolbars must be installed into a terminal device by the user, that the operation interface or function buttons of the conventional toolbars are not designed for easy modification and are therefore user-unfriendly, and that the conventional toolbars will not be available for use on different computers unless they are installed in each of the computers, which is very inconvenient and reduces the user's willingness to use the toolbars, the inventor of the present invention conducted extensive research and experiment and finally succeeded in developing a method for automatically inserting an embedded toolbar into a web browser directly by way of a gateway device. The disclosed method is intended to provide users with an unprecedented experience of the use of toolbars and enable the related companies to secure their positions in the Internet industry.

It is an object of the present invention to provide a method for automatically inserting an embedded toolbar into a web browser directly by way of a gateway device, wherein the method is applicable to a network system including at least one terminal device (e.g., a personal computer, personal digital assistant, etc.), at least one web server, and at least one embedded toolbar server, in addition to the gateway device (e.g., a router, gateway, modem, etc.). The gateway device is connected to the at least one terminal device, the at least one web server, and the at least one embedded toolbar server in a wired or wireless manner so as to receive messages from or send messages to the corresponding device or server. In addition, the at least one terminal device cannot connect to the Internet unless through the gateway device. The method is carried out as follows. To begin with, one of the at least one terminal device has a web browser thereof activated. The terminal device receives a web page request instruction (e.g., a web page request instruction generated according to the user-inputted website address of Google) and sends the web page request instruction to the gateway device. Upon receiving the web page request instruction and according to the web page address contained therein, the gateway device redirects the web page request instruction to the web server corresponding to the web page address. In return, the web server sends to the gateway device the web page message specified by the web page request instruction. The gateway device receives the web page message, inserts a first toolbar request instruction into the web page message, and sends the web page message to the terminal device along with the first toolbar request instruction, wherein the first toolbar request instruction is written in a dynamic scripting language (e.g., JavaScript, JScript). After reading the web page message and the first toolbar request instruction, the terminal device generates a second toolbar request instruction according to the first toolbar request instruction and sends the second toolbar request instruction to the gateway device. The gateway device receives the second toolbar request instruction, generates a third toolbar request instruction according to the toolbar website address contained in the second toolbar request instruction, and sends the third toolbar request instruction to the embedded toolbar server corresponding to the toolbar website address. After the embedded toolbar server sends the embedded toolbar message specified by the third toolbar request instruction to the gateway device, the gateway device redirects the embedded toolbar message to the terminal device, so as for the web browser of the terminal device to show the embedded toolbar corresponding to the embedded toolbar message as well as the web page corresponding to the web page message. The user can click the at least one button of the embedded toolbar to open the corresponding web page message (e.g., weather conditions, news, gateway device status, etc.), without having to input the corresponding web page address each time a certain web page message is desired. Since the user does not have to install the embedded toolbar additionally, either from a compact disc or by downloading an installation program from the Internet, the convenience of use of the embedded toolbar is effectively increased.

It is another object of the present invention to provide the foregoing method, wherein after the embedded toolbar is shown in the web browser, the terminal device receives a login request instruction (e.g., based on the user-inputted user name and password) and sends the login request instruction to the gateway device. According to the toolbar website address contained in the login request instruction, the gateway device sends the login request instruction to the embedded toolbar server corresponding to the toolbar website address. After the user name and the password contained in the login request instruction are verified by the embedded toolbar server as legitimate, the embedded toolbar server sends to the gateway device the personalized embedded toolbar message specified by the login request instruction. The gateway device then sends the personalized embedded toolbar message to the terminal device, so as for the terminal device to show in the web browser the personalized embedded toolbar corresponding to the personalized embedded toolbar message. Thus, the user can add freely to the embedded toolbar the buttons for activating various services (e.g., e-mail, personal blog, etc.), thereby creating an embedded toolbar with personal features that suit the user's preference or needs. Furthermore, wherever the user desires to surf the Internet (e.g., at home, at school, in an Internet café, etc.), the pre-planned embedded toolbar can be activated with the same ease.

BRIEF DESCRIPTION OF THE SEVERAL VIEWS OF THE DRAWINGS

The structure as well as a preferred mode of use, further objects, and advantages of the present invention will be best understood by referring to the following detailed description of some illustrative embodiments in conjunction with the accompanying drawings, in which.

DETAILED DESCRIPTION OF THE INVENTION

Figure 1:
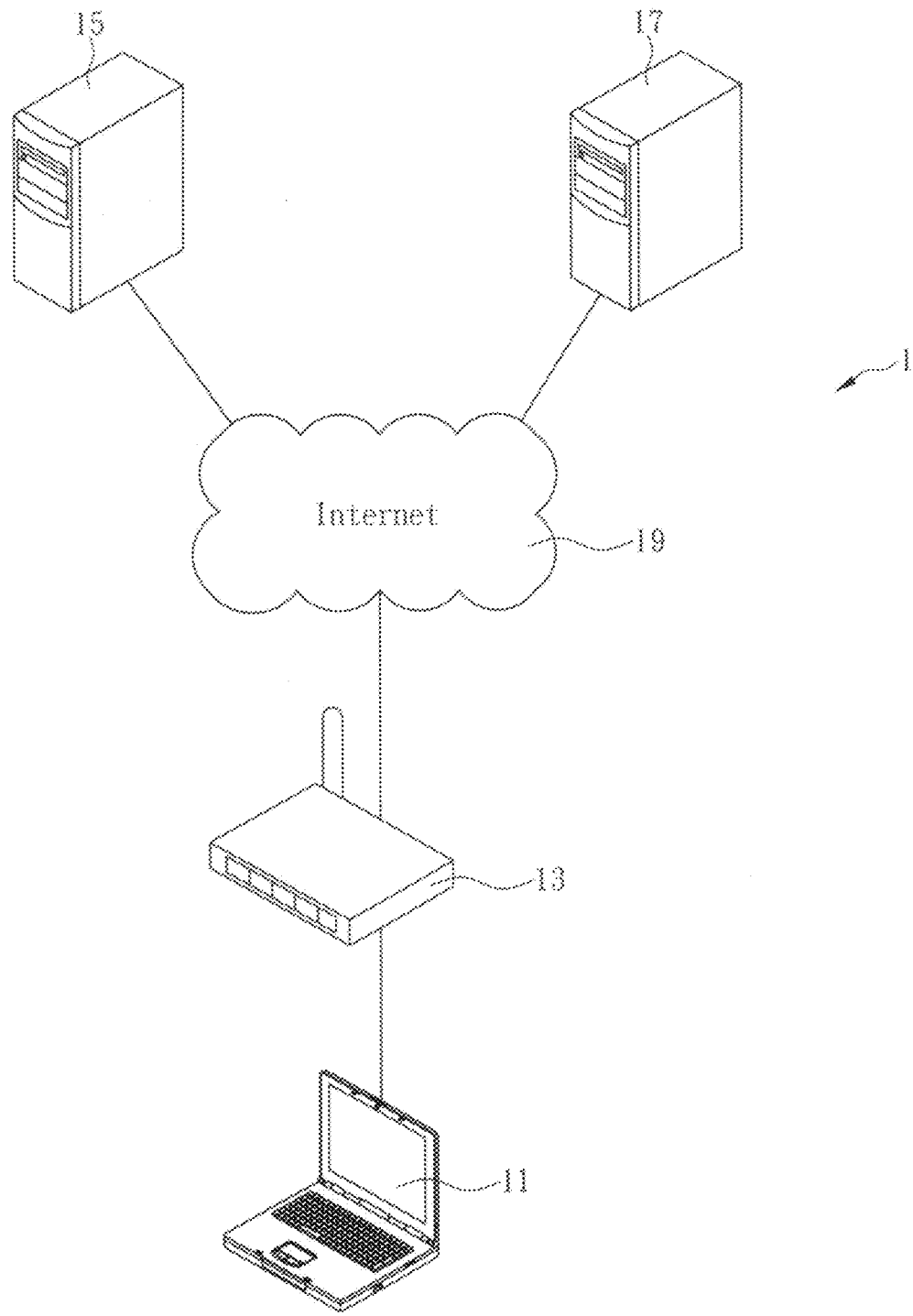
FIG. 1 is a schematic diagram of a network system according to the present invention.

As previously mentioned, web browsers nowadays (e.g., Internet Explorer, Firefox, Google Chrome) typically support dynamic scripting languages (e.g., JavaScript, JScript). Moreover, a terminal device (e.g., a personal computer, intelligent mobile phone, personal digital assistant, etc.) cannot send data packets to the intended destination over the Internet without a gateway device (e.g., a router, gateway, modem, etc.), and all the data packets to be sent to the terminal device must be checked by the gateway device before being sent to the terminal device; in other words, the gateway device is an indispensable device in the network system. Based on the aforesaid requirements, the inventor of the present invention designed a novel method for inserting an embedded toolbar into a web browser and thereby enhancing the convenience of use of toolbars in general. It should be noted that the "toolbar" described and depicted in the following embodiments and the accompanying drawings refers to at least one button that is shown in the web page image displayed by a web browser, and once triggered via an input device (e.g., a mouse), the toolbar opens another image for providing subsequent services. It is understood that the design of the toolbar is not limited to those shown in the drawings and may be changed as appropriate.

The present invention provides a method for automatically inserting an embedded toolbar into a web browser directly through a gateway device. The method is applicable mainly to a network system 1 as shown in FIG. 1, wherein the network system 1 includes at least one terminal device 11, a gateway device 13, at least one web server 15, and at least one embedded toolbar server 17. The gateway device 13 is connected to the at least one terminal device 11, the at least one web server 15, and the at least one embedded toolbar server 17 respectively in a wired or wireless manner, so as for the at least one terminal device 11 to send all kinds of messages or instructions to the gateway device 13, and for the gateway device 13 to send the received messages or instructions to the corresponding web server 15 or embedded toolbar server 17 on the external Internet 19. The gateway device 13 is also configured to send the messages or instructions fed back from the at least one web server 15 or embedded toolbar server 17 to the corresponding terminal device 11. Thus, the user can retrieve data or files from each server 15 or 17 on the Internet 19 by means of any terminal device 11.

Figure 2:
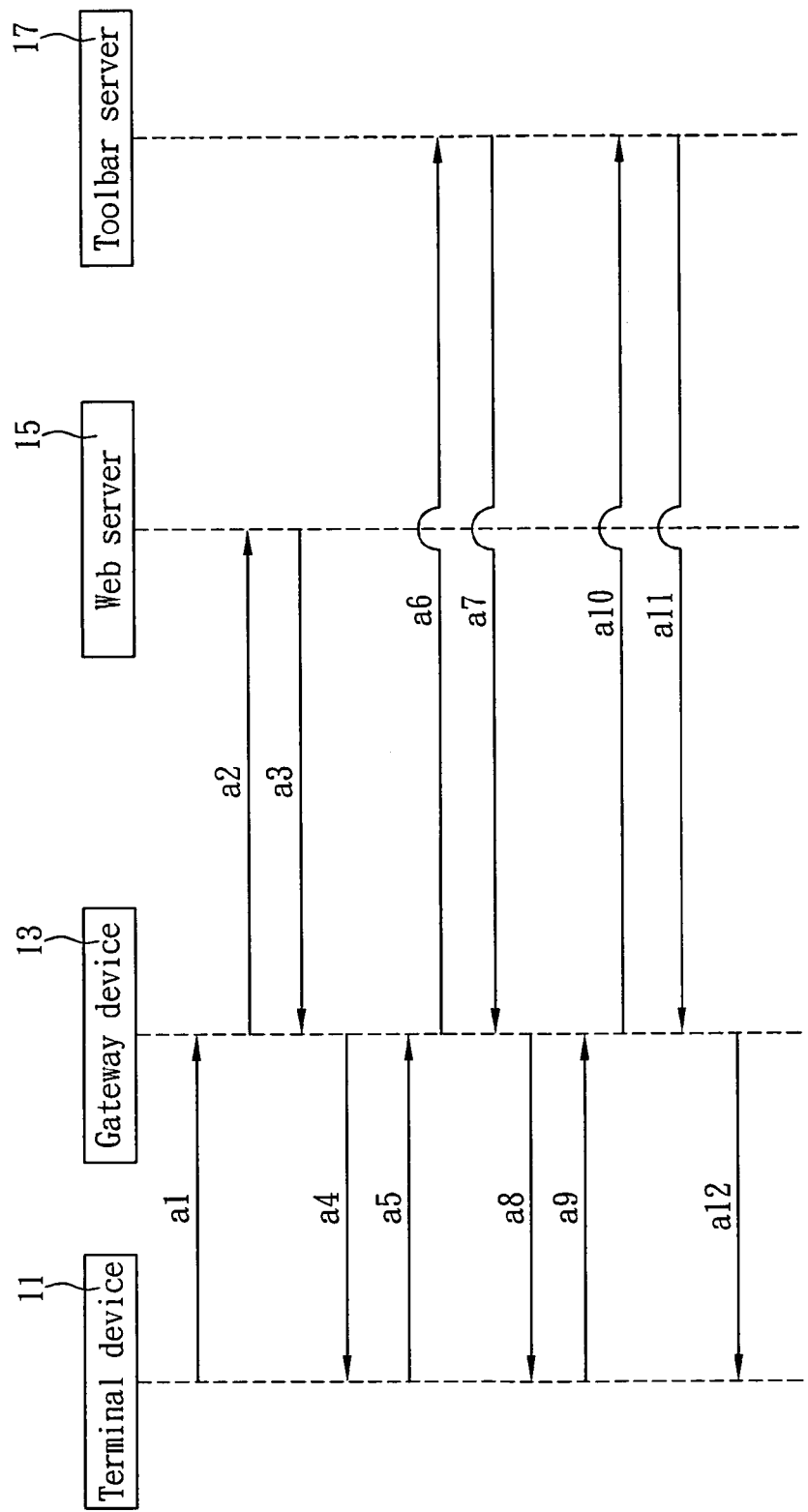
FIG. 2 is a time sequence diagram for inserting an embedded toolbar according to the present invention.

Referring to FIGS. 1 and 2, in a preferred embodiment of the present invention, after the user starts a web browser (e.g., Internet Explorer) of the terminal device 11 and inputs a web page address (e.g., http://www.google.com.tw/) into the web browser, the web browser generates a web page request instruction according to the web page address. The terminal device 11 receives the web page request instruction and sends the web page request instruction to the gateway device 13 (as indicated by a1 in FIG. 2). Upon receiving the web page request instruction, the gateway device 13 reads the web page address (http://www.google.com.tw/) contained in the web page request instruction and sends the web page request instruction via the Internet 19 to the web server 15 corresponding to the web page address (as indicated by a2 in FIG. 2). In response, this web server 15 sends to the gateway device 13 the web page message (e.g., the homepage of Google) specified by the web page request instruction (as indicated by a3 in FIG. 2). After receiving the web page message, the gateway device 13 checks the outbound port and the HTTP status code of the web page message. Generally speaking, the preset outbound port of a web page message is 80. Therefore, if it is determined by the gateway device 13 that the outbound port of the received data packet is 80, the data packet is identified as a web page message. On the other hand, the HTTP status code is a three-digit code representing the HTTP response status of the web server 15. An HTTP status code of 200 signifies that a request is accepted and that the requested response header or data body will be returned along with the response. According to the method of the present invention, if the gateway device 13 determines that the outbound port and the HTTP status code of the web page message are 80 and 200 respectively, the gateway device 13 inserts a first toolbar request instruction into the web page message, wherein the first toolbar request instruction is written in a dynamic scripting language (e.g., JavaScript, JScript). For example, <script type="text/javascript" src="!http://www.google.com/837273/toolbar.js"> is inserted in between <body></body> of the source code (HTML) of the web page message. Following that, the gateway device 13 sends the web page message, along with the first toolbar request instruction, to the terminal device 11 (as indicated by a4 in FIG. 2), so as for the terminal device 11 to execute the web page message and the first toolbar request instruction and display in the web browser the web page contents (e.g., the Google homepage) corresponding to the web page message. In a different embodiment of the present invention, however, the contents of the outbound port, the HTTP status code, and the first toolbar request instruction may vary according to design requirements or network environments and are not limited to those described above.

In addition, most of the web browsers nowadays do not allow cross-domain access. For instance, if the domain of a main web page (e.g., www.google.com) is different from that of an iframe (e.g., a.com), then interaction between the main web page and the iframe is prohibited. In other words, the resources of the website being connected to are not accessible to a website of a different domain. To solve this problem, referring to FIGS. 1 and 2, the gateway device 13 of the present invention randomly generates a random number (e.g., the number "837273" in the aforesaid first toolbar request instruction), records the random number, and adds the random number to the first toolbar request instruction. The terminal device 11 then reads the web page message and the first toolbar request instruction, executes the first toolbar request instruction, converts it into a second toolbar request instruction, and sends the second toolbar request instruction to the gateway device 13 (as indicated by a5 in FIG. 2). Upon receiving the second toolbar request instruction, the gateway device 13 reads the toolbar website address contained therein (e.g., http://www.google.com/837273/toolbar.js) and determines whether the toolbar website address includes the random number ("837273"). If yes, the gateway device 13 automatically converts the second toolbar request instruction into a third toolbar request instruction (e.g., http://www.muchii-i.com/toolbar.js) and sends the third toolbar request instruction to the embedded toolbar server 17 of the corresponding domain (e.g., http://www.muchiii.com/) (as indicated by a6 in FIG. 2) rather than of the original domain of the toolbar website address (e.g., http://www.google.com/). Thus, when websites of different domains are simultaneously shown on the same web page displayed by the web browser, the websites are allowed to interact with one another. In a different embodiment of the present invention, however, an identification mechanism other than the one described above—which is based on the identification of a random number—can be used. For instance, a pre-defined packet field can be added to the second toolbar request instruction, and the gateway device 13 is configured to generate the third toolbar request instruction upon reading that particular packet field.

As shown in FIGS. 1 and 2, the embedded toolbar server 17 receives the third toolbar request instruction and sends to the gateway device 13 the embedded toolbar message specified by the third toolbar request instruction (as indicated by a7 in FIG. 2). In turn, the gateway device 13 sends the embedded toolbar message to the terminal device 11 (as indicated by a8 in FIG. 2), so as for the terminal device 11 to display in the web browser not only the web page contents corresponding to the web page message (e.g., the Google homepage) but also the embedded toolbar corresponding to the embedded toolbar message (as indicated by the dashed-line box in FIG. 3), wherein the embedded toolbar includes at least one button. The user can click any button of the embedded toolbar displayed on the web page and thereby open the web page message (e.g., a game image as indicated by the dashed-line box in FIG. 4) corresponding to the function of the clicked button (e.g., starting a game or showing weather conditions, news, gateway device status, etc.). Thus, the number of times that the user is required to input web page addresses repeatedly can be significantly reduced. Furthermore, as the method of the present invention relies on the gateway device 13 to directly show embedded toolbars on a web page, the user can make Internet connections from different locations (e.g., from home, the user's office, an Internet café) and take instant advantage of the embedded toolbars without having to install the toolbars into each terminal device 11 either from a compact disc or by downloading installation programs from the Internet. As a result, the convenience of use of the embedded toolbars is effectively increased.

Moreover, as the preset buttons of an embedded toolbar do not necessarily meet the user's needs, the method of the present invention further allows the user to create personalized embedded toolbars, with a view to catering to users of different age groups and hence of different Internet use habits. Referring again to FIGS. 1 and 2, once the embedded toolbar is shown in the web browser, the user can input his or her user name and password via the embedded toolbar to form a login request instruction, wherein the user name and the password are obtained by the user after applying to the related company. Since the application of the user name and the password does not constitute a technical feature of the present invention, the application process is not dealt with in detail herein. The terminal device 11 receives the login request instruction and sends the login request instruction to the gateway device 13 (as indicated by a9 in FIG. 2). After that, based on the toolbar website address contained in the login request instruction, the gateway device 13 redirects the login request instruction to the embedded toolbar server 17 corresponding to the toolbar website address (as indicated by a10 in FIG. 2). If the user name and the password in the login request instruction are verified by the embedded toolbar server 17 as legitimate, the embedded toolbar server 17 will read from itself the personalized embedded toolbar corresponding to the user name and the password, convert the personalized embedded toolbar into a personalized embedded toolbar message, and send the personalized embedded toolbar message to the gateway device 13 (as indicated by a11 in FIG. 2). The gateway device 13 then sends the personalized embedded toolbar message to the terminal device 11 (as indicated by a12 in FIG. 2) to replace the existing embedded toolbar. Finally, upon reading the personalized embedded toolbar message, the terminal device 11 displays in the web browser the personalized embedded toolbar corresponding to the personalized embedded toolbar message.

Figure 5:
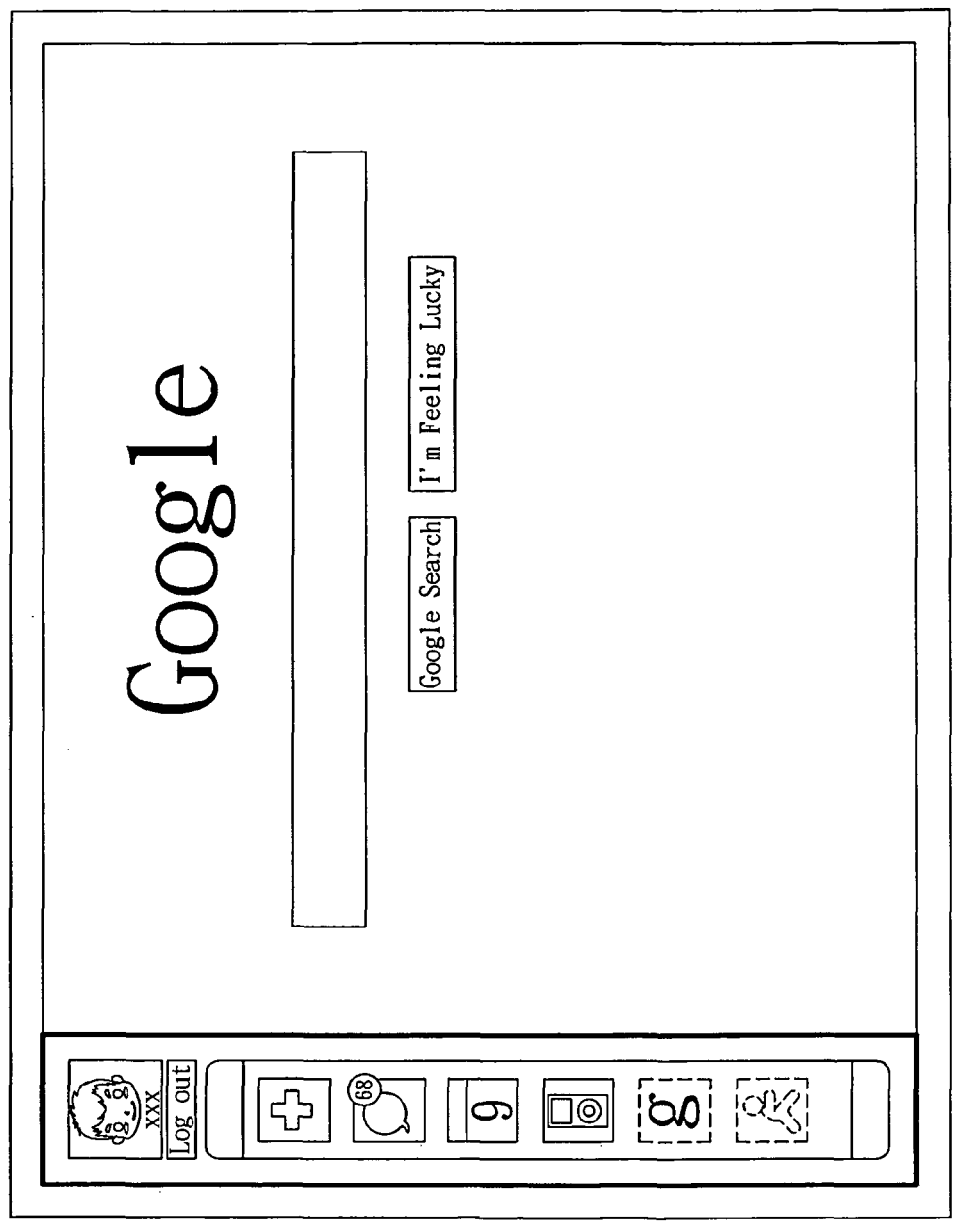
FIG. 5 schematically shows the embedded toolbar with newly added buttons.
Figure 6:
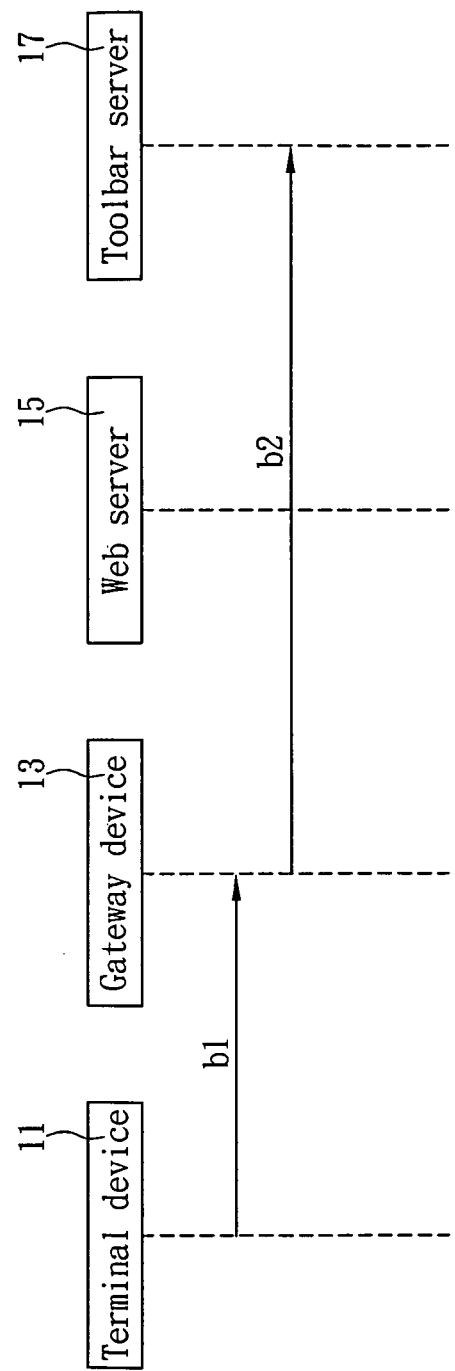
FIG. 6 is a time sequence diagram for adding a button to the embedded toolbar.

With reference to FIG. 1, the user can add buttons to or remove buttons from the existing embedded toolbar as needed while browsing the Internet through the terminal device 11, provided that the user has applied for and successfully obtained the legitimate user name and password. More specifically, when the user logs in for the first time, the personalized embedded toolbar has the original buttons. Later, the user can mouse-click an Add New Item button of the personalized embedded toolbar (e.g., the button with a cross-shaped pattern in FIG. 5) while browsing his or her own blog, so that the personalized embedded toolbar captures the current web page address and converts it into an instruction to add new buttons (hereinafter referred to as an "Add New Button instruction"). The terminal device 11 sends the Add New Button instruction to the gateway device 13 (as indicated by b1 in FIG. 6). Then, according to the toolbar website address contained in the Add New Button instruction, the gateway device 13 redirects the Add New Button instruction to the embedded toolbar server 17 corresponding to the toolbar website address (as indicated by b2 in FIG. 6), so as for the embedded toolbar server 17 to store the item button (e.g., the buttons indicated by the dashed-line boxes in FIG. 5) contained in the Add New Button instruction into the personalized embedded toolbar of the corresponding user name, thus creating a unique personalized embedded toolbar. While the original embedded toolbar also has the Add New Item button (e.g., the button with a cross-shaped pattern in FIG. 3), this button will not function until the user performs the login process. Alternatively, it is feasible for the original embedded toolbar to dispense with the Add New Item button, and only the personalized embedded toolbar is provided with the Add New Item button.

Figure 3:
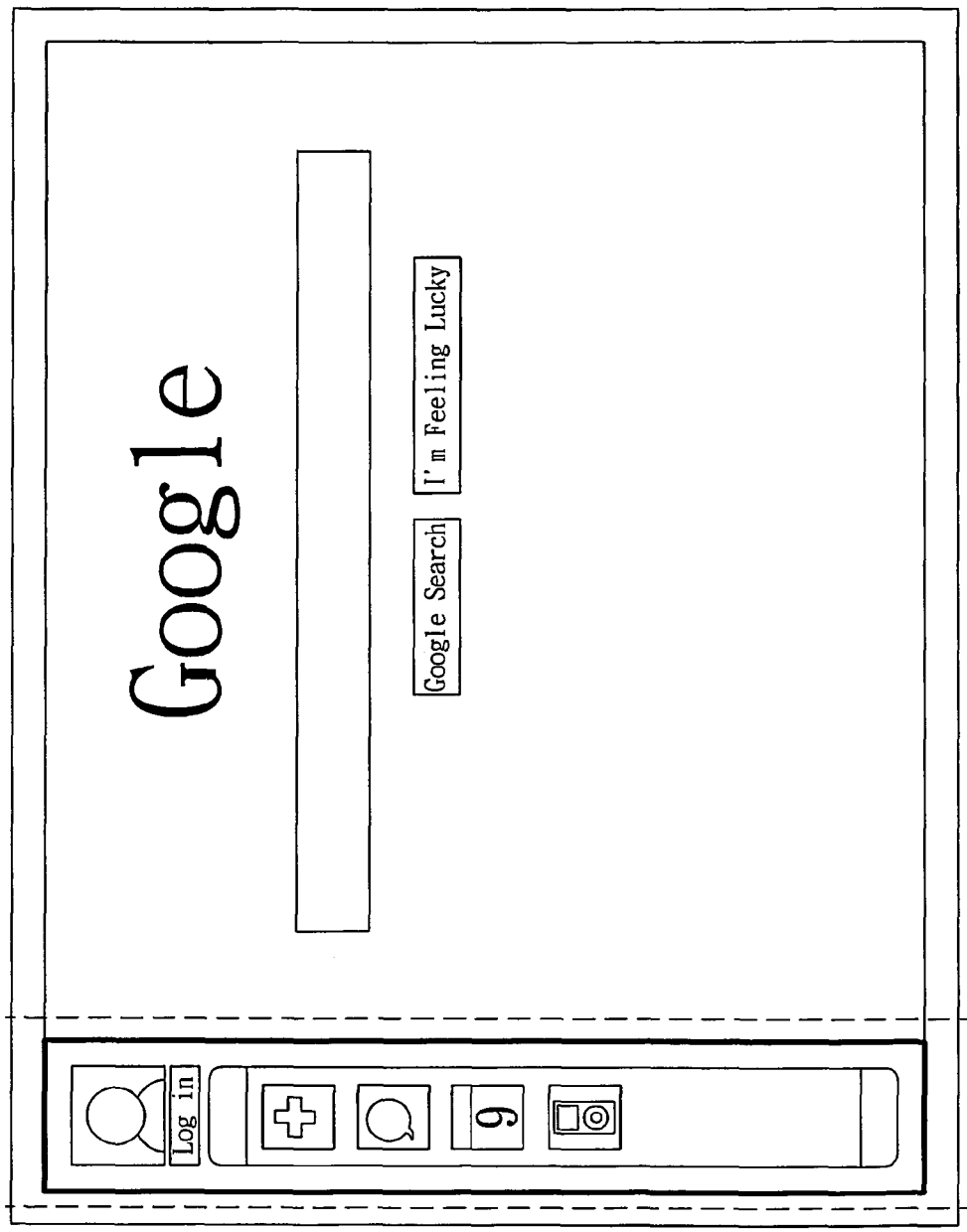
FIG. 3 schematically shows a web page and an embedded toolbar that are displayed in a web browser.
Figure 4:
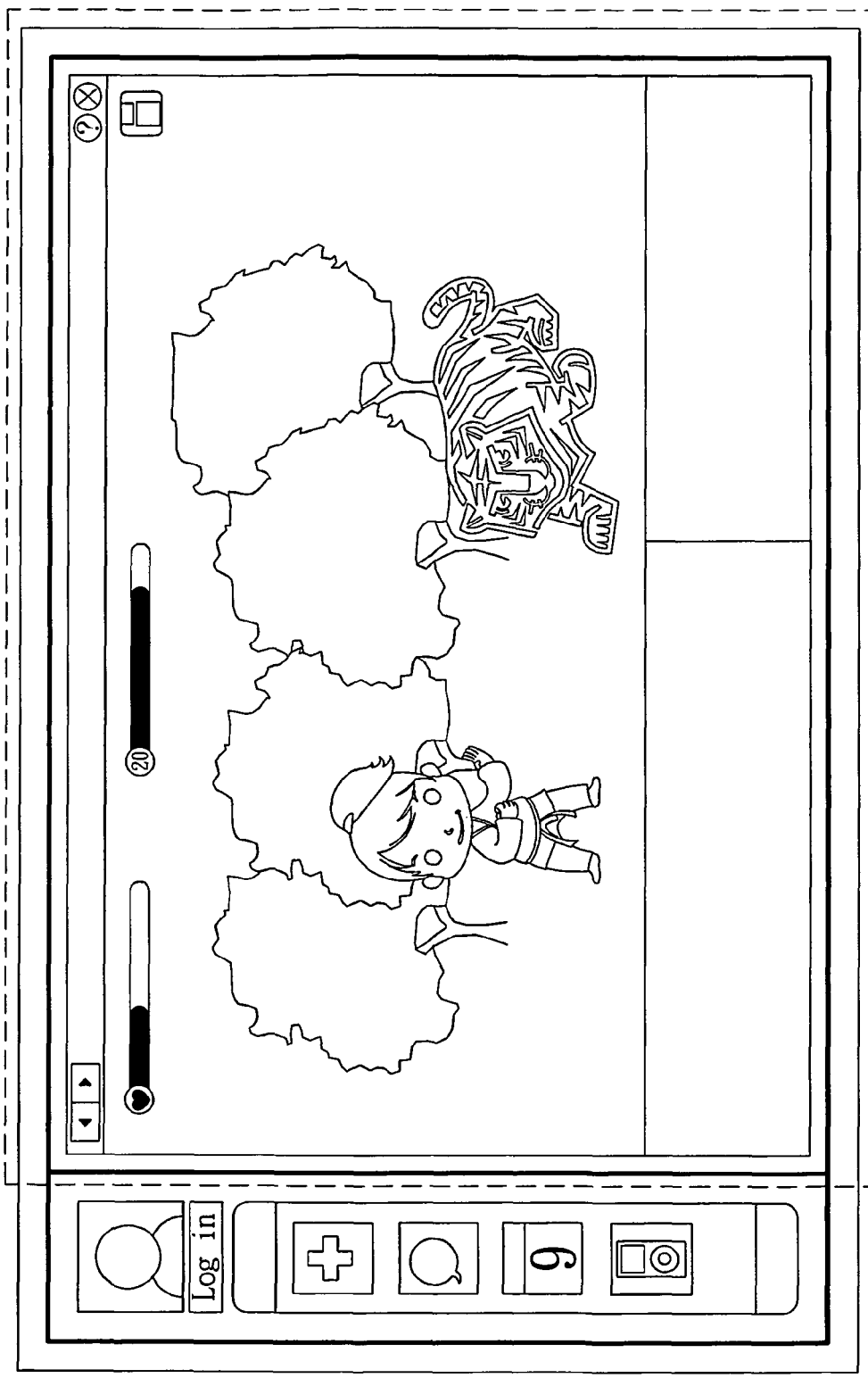
FIG. 4 schematically shows a web page message opened by activating a button of the embedded toolbar.
Figure 7:
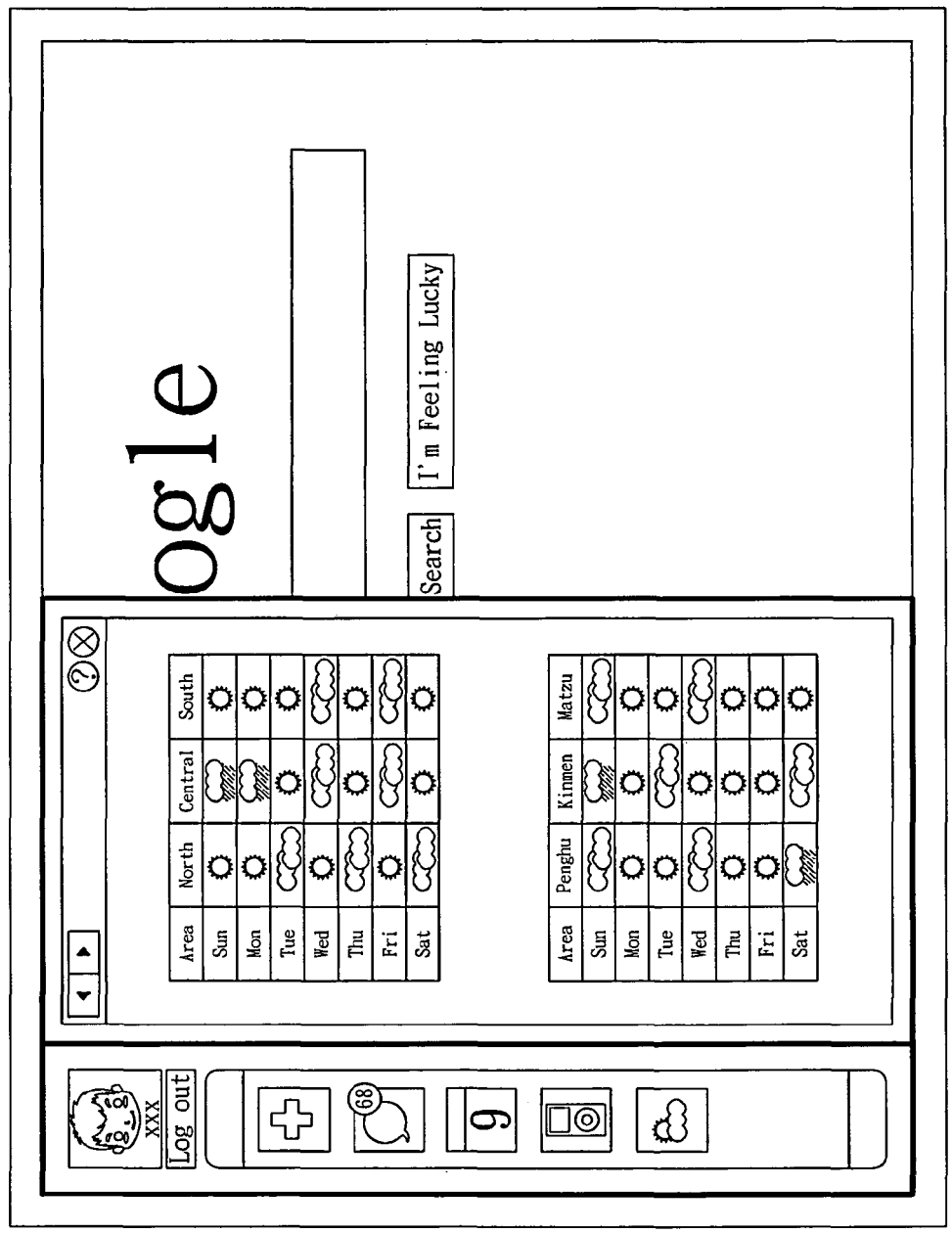
FIG. 7 schematically shows a standard view opened by the embedded toolbar, wherein the standard view partially covers the web page.

It should be pointed out that the embedded toolbar (or personalized embedded toolbar) of the present invention overlaps and is located above the layer where the web page exists. Once the embedded toolbar (or personalized embedded toolbar) is inserted, the composition of the existing web page is moved toward the right as a whole (as shown in FIG. 3), although the embedded toolbar (or personalized embedded toolbar) and the web page are on different layers. When a button of the embedded toolbar (or personalized embedded toolbar) is clicked to open a standard view, the standard view will open directly and cover the web page without altering the position of the web page (as shown in FIG. 7). In a different embodiment of the present invention, the embedded toolbar (or personalized embedded toolbar) may be positioned on the upper, lower, or right side of the web page, instead of being on the left side of the web page as illustrated herein. The embedded toolbar (or personalized embedded toolbar) may also be configured on the same layer as the web page. In that case, the standard view opened by clicking a button of the embedded toolbar (or personalized embedded toolbar) will move the existing web page away from the embedded toolbar (or personalized embedded toolbar).

The embodiments described herein are only the preferred ones and are not intended to limit the scope of the present invention, which is defined only by the appended claims. All equivalent changes which are based on the technical contents disclosed herein and easily conceivable by a person skilled in art should fall within the scope of the present invention. The terminology used in the disclosure of the foregoing embodiments is descriptive only so as to enable the general public, scientists, engineers, and persons of ordinary skill in the art to rapidly comprehend the substance and essence of the disclosed contents; the terminology of the present specification should not be construed as a limitation of the present invention.

What is claimed is:

1. A method for automatically inserting an embedded toolbar into a web browser directly by way of a gateway device, the method being applicable to a network system, the network system comprising the gateway device, at least a terminal device, at least a web server, and at least an embedded toolbar server, the gateway device being connected to the at least a terminal device, the at least a web server, and the at least an embedded toolbar server respectively, wherein each said terminal device cannot connect to the external Internet unless through the gateway device, the method comprising the following steps executed by the gateway device:

receiving a web page request instruction from said terminal device after a web browser of said terminal device is activated and said terminal device receives the web page request instruction;

sending the web page request instruction to a said web server that corresponds to a web page address contained in the web page request instruction;

receiving a web page message specified by the web page request instruction from the said web server;

inserting a first toolbar request instruction into the web page message, and sending the web page message along with the first toolbar request instruction to the said terminal device, wherein the first toolbar request instruction is written in a dynamic scripting language, and the gateway device randomly generates a random number and adds the random number to the first toolbar request instruction;

receiving a login request instruction from said terminal device and sending the login request instruction to a said embedded toolbar server that corresponds to a toolbar website address contained in the login request instruction;

receiving a personalized embedded toolbar message from the said embedded toolbar server, wherein the personalized embedded toolbar message is converted from a personalized embedded toolbar corresponding to a user name and a password in the login request instruction by the said embedded toolbar server after verifying that the user name and the password are legitimate;

sending the personalized embedded toolbar message to the said terminal device, so as for the said terminal device to replace an existing embedded toolbar with the personalized embedded toolbar and display the personalized embedded toolbar in the web browser;

receiving a second toolbar request instruction from said terminal device, wherein the second toolbar request instruction is generated by said terminal device according to the web page message and the first toolbar request instruction;

generating a third toolbar request instruction according to a toolbar website address contained in the second toolbar request instruction, and sending the third toolbar request instruction to a corresponding said embedded toolbar server, wherein the gateway device converts the second toolbar request instruction into the third toolbar request instruction only when it is determined by the gateway device that the toolbar website address contained in the second toolbar request instruction includes the random number;

receiving an embedded toolbar message specified by the third toolbar request instruction from the corresponding embedded toolbar server; and sending the embedded toolbar message to the said terminal device, so that the said terminal device displays in the web browser a web page corresponding to the web page message and an embedded toolbar corresponding to the embedded toolbar message.

2. The method of claim 1, wherein upon receiving the web page message from the said web server, the gateway device determines whether an outbound port and an HTTP status code of the web page message are 80 and 200 respectively, the gateway device inserting the first toolbar request instruction into the web page message only if yes.

3. The method of claim 2, wherein the embedded toolbar overlaps and is located above a layer where the web page exists, and the web browser moves a composition of the web page away from the embedded toolbar when the embedded toolbar is inserted, the embedded toolbar being configured to open a standard view that covers the web page.

4. The method of claim 3, further comprising the steps of:
receiving an instruction to add new buttons from the said terminal device; and sending the instruction to add new buttons to a said embedded toolbar server that corresponds to a toolbar website address contained in the instruction to add new buttons, so as for the said embedded toolbar server to store an item button contained in the instruction to add new buttons into the personalized embedded toolbar corresponding to the user name.

5. The method of claim 4, wherein the personalized embedded toolbar overlaps and is located above the layer where the web page exists, and the web browser moves a composition of the web page away from the personalized embedded toolbar when the personalized embedded toolbar is inserted, the personalized embedded toolbar being configured to open a standard view that covers the web page.

6. A method for automatically inserting an embedded toolbar into a web browser directly by way of a gateway device, the method being applicable to the gateway device, the gateway device being connected to a terminal device, at least a web server, and at least an embedded toolbar server respectively, wherein said terminal device cannot connect to the external Internet unless through the gateway device, the method comprising the following steps executed by the gateway device:

receiving a web page request instruction from the terminal device and, according to a web page address contained in the web page request instruction, sending the web page request instruction to a said web server that corresponds to the web page address;

receiving a web page message from the said web server and determining whether an outbound port of the web page message is a preset port and whether an HTTP status code of the web page message is a preset number;

inserting a first toolbar request instruction into the web page message and sending the web page message along with the first toolbar request instruction to the terminal device, after determining that the outbound port is the preset port and that the HTTP status code is the preset number, wherein the gateway device is configured to generate a random number and add the random number to the first toolbar request instruction;

receiving a second toolbar request instruction from the terminal device, generating a third toolbar request instruction according to a toolbar website address contained in the second toolbar request instruction, and sending the third toolbar request instruction to a corresponding said embedded toolbar server, wherein the gateway device converts the second toolbar request instruction into the third toolbar request instruction only when it is determined by the gateway device that the toolbar website address contained in the second toolbar request instruction includes the random number; and receiving an embedded toolbar message from the corresponding embedded toolbar server and sending the embedded toolbar message to the terminal device, so that the said terminal device displays an embedded toolbar corresponding to the embedded toolbar message.

7. The method of claim 6, wherein the preset port is 80, and the preset number is 200.

* * * * *